US012285796B2

(12) United States Patent
Teaford et al.

(10) Patent No.: US 12,285,796 B2
(45) Date of Patent: Apr. 29, 2025

(54) WEDGE DRIVER AND METHOD THEREFOR

(71) Applicant: BNSF Railway Company, Fort Worth, TX (US)

(72) Inventors: Mike E. Teaford, Topeka, KS (US); Ryan L. Kimberlin, Meriden, KS (US); Larry C. Valentine, Berryton, KS (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 18/390,619

(22) Filed: Dec. 20, 2023

(65) Prior Publication Data

US 2024/0123491 A1 Apr. 18, 2024

Related U.S. Application Data

(63) Continuation of application No. 18/065,235, filed on Dec. 13, 2022, now Pat. No. 11,850,656, which is a (Continued)

(51) Int. Cl.
*B21L 1/00* (2006.01)
*B21L 21/00* (2006.01)

(52) U.S. Cl.
CPC ............... *B21L 1/00* (2013.01); *B21L 21/00* (2013.01)

(58) Field of Classification Search
CPC ........... B25B 27/00; B25B 3/00; B25B 5/067; B25B 5/125; B25B 5/101; B21L 1/00
See application file for complete search history.

(56) References Cited

U.S. PATENT DOCUMENTS 1,919,184 A 7/1933 Bartsch
2,062,759 A 12/1936 Osborn
(Continued)

FOREIGN PATENT DOCUMENTS

WO 2008022098 A3 5/2008
WO 2022203817 A1 9/2022

OTHER PUBLICATIONS

Harbor Freight; Universal Overhead Valve Spring Compressor; Feb. 15, 2021; Feb. 15, 2021; https://www.harborfreight.com/universal-overhead-valve-spring-compressor-60335.html?cid=paid_google|||60335&utm_source=google&ut.
(Continued)

*Primary Examiner* — Lee D Wilson
(74) *Attorney, Agent, or Firm* — Whitaker Chalk Swindle & Schwartz PLLC; Enrique Sanchez, Jr.; Bradley J. Birchfield

(57) ABSTRACT

A wedge driver and method therefor is presented. A wedge driver can be operably coupled to different ends of a link joiner to drive a wedge therebetween to form a single link. The wedge driver can also drive the wedge out of the link joiner. The present disclosure provides the benefit of allowing the safe and effective removal of the link joiner by preventing violent or forceful decoupling of a link joiner. The wedge driver can include a trunk, a first prong, a second prong, a bolt, and a driver. The driver can be spring enabled, such that the driver can recede into the trunk as the bolt egresses the trunk. A bolt of the wedge driver can push a driver out of the trunk to axially drive the wedge into (or out of) a link joiner without rotating the wedge.

20 Claims, 9 Drawing Sheets

Related U.S. Application Data continuation of application No. 17/301,121, filed on Mar. 25, 2021, now Pat. No. 11,607,720.

(56) References Cited

U.S. PATENT DOCUMENTS

| | | | |
|---|---|---|---|
| 2,143,164 | A | 1/1939 | Olander |
| 2,152,376 | A | 3/1939 | Endicott |
| 1,807,329 | A | 5/1939 | West et al. |
| 2,166,256 | A | 7/1939 | Lindeman |
| 2,257,307 | A | 9/1941 | Olander |
| 3,625,086 | A | 12/1971 | Natschke |
| 3,997,961 | A | 12/1976 | Sandrick |
| 4,235,004 | A | 11/1980 | Floyd |
| 4,291,793 | A | 9/1981 | Klasing |
| 4,769,890 | A | 9/1988 | Maynard |
| 4,801,288 | A | 1/1989 | Schmitt et al. |
| 5,271,136 | A | 12/1993 | Skoworodko |
| 6,266,861 | B1 | 7/2001 | Chen |
| 6,943,675 | B2 | 9/2005 | Petersen et al. |
| 7,896,140 | B2 | 3/2011 | Heitmeyer |
| 8,123,004 | B2 | 2/2012 | Klasing et al. |
| 8,616,341 | B2 | 12/2013 | Gregar |
| 8,931,153 | B1 * | 1/2015 | Kimminau ............... B25B 13/48 29/256 |
| 9,026,281 | B2 | 5/2015 | Murphy et al. |
| 9,488,252 | B2 | 11/2016 | Michel et al. |
| 9,758,136 | B2 | 9/2017 | Wright et al. |
| 11,607,720 | B2 * | 3/2023 | Teaford ................. B61H 13/02 |
| 11,850,656 | B2 * | 12/2023 | Teaford ................. B60T 17/228 |
| 2011/0203089 | A1 | 8/2011 | Riestra |
| 2022/0305547 | A1 * | 9/2022 | Teaford ................. B25B 27/22 |
| 2023/0110959 | A1 * | 4/2023 | Teaford ..................... B21L 1/00 59/25 |
| 2024/0123491 | A1 * | 4/2024 | Teaford ................. B25B 27/023 |

OTHER PUBLICATIONS

Tiger Tool; Pin Press; Feb. 15, 2021; https://tigertool.com/products/pin-press?variant=33854559649930&utm_medium=cpc&utm_source=google&utm_campaign=Google%20Shopping&currency=USD&gclid=EAlalQobChMIw8Oh9vDs7gIVEYizCh0JXgt7EAKYBSABEgKI9_D_BwE.

PCT/US2022/018131 Internations Search Report and Written Opinion, mailed Jul. 28, 2022, 15 pages.

* cited by examiner

WEDGE DRIVER AND METHOD THEREFOR

CROSS-REFERENCE TO RELATED APPLICATIONS

The present application is a Continuation of U.S. patent application Ser. No. 18/065,235, filed Dec. 13, 2022 which is a Continuation of U.S. patent application Ser. No. 17/301,121, filed Mar. 25, 2021 the entirety of which is herein incorporated by reference for all purposes.

TECHNICAL FIELD

The present disclosure relates generally to driving wedges used in link joiners. More specifically, in certain embodiments, the present disclosure relates to the installation or removal of link joiners in locomotive handbrake chains.

BACKGROUND

Coupling links, or links, are used in a wide variety of industries. Hammer links, such as hammerlock coupling links, are often used to splice chain segments together, repair broken chains, or attach chains to other components. Generally, hammer links are operable to open and receive, e.g., a chain link and another component (such as another chain link), and subsequently securely close to couple the elements together. Some hammer links utilize wedges that can be driven into the links to facilitate the secure coupling of the link to a given component. These types of hammer links, sometimes referred to as "link joiners," are often used in the railroad industry, such as in locomotive handbraking systems.

Locomotives are generally affixed with the equivalent of a parking brake, and these brakes can be referred to as handbrakes. As the name suggests, locomotive handbrakes are operable by hand, and when a locomotive is "parked," the handbrake is engaged to prevent unwanted movement of the locomotive on the tracks. Locomotive handbrake systems generally include several components, such as the handle, brake lever, brake shoes/pads, and brake cylinders. A handle can be located on the walkway of a locomotive to be accessible to the conductor, and the handle can be in operable connection with a brake lever or levers located under the train. The brake lever, when engaged, causes the brake shoes and/or pads to contact the wheels of the locomotive, facilitating the braking of the train. The brake cylinder, in operable connection with the brake lever and brake shoes, can hydraulically supplement the force that the shoes apply to the wheels. To enable the handle on the walkway to engage the brake shoes, a chain often connects the handle to the brake lever; the chain is tensioned between the handle and lever. When the handle is engaged, the chain can be tightened further, which engages the brake lever and ultimately causes the brake shoes to contact the wheels of the train.

As with all other mechanical ingenuities, locomotives and their handbraking systems can require maintenance. For example, components will rust or break and need repair, and with respect to handbraking systems, the chains connecting the brake handle to the brake lever are no exception. If these chains break, need to be extended, or simply need to be replaced/removed to enable maintenance to be performed on other handbrake system components, installation and/or removal of link joiners incorporated into the chains can be required. For example, link joiners can serve as a chain link, such as when new lengths of chain are spliced in; in another example, link joiners can facilitate connection of the chain to the handle or lever. In any event, link joiners will often need to be installed on a brake chain or taken off of a brake chain when handbrake system maintenance is performed. Such tasks can be arduous and dangerous even on slackened brake chains—the wedges of link joiners require significant force to be inserted and removed, and using a hammer or other device on the wedge can be dangerous to personnel performing these tasks. These problems are then greatly compounded when the brake chains are tensioned by hand, because removal of the link joiner can release the tension in the chain, sometimes violently, which can injure personnel or damage property.

Because of these issues, two people are often needed to remove a link joiner from a tensioned brake chain—one person to tension the chain by hand such that the link joiner is relieved of strain, and one person to open the link joiner. However, even working in pairs, this job can be dangerous, as human error is inevitable; further, it can be onerous to attempt to, for example, hammer a wedge out of a link joiner while the link joiner is suspended in a length of chain. As such, railroad personnel will oftentimes be required to detach the chain from the handbrake system to enable the attachment or removal of a link joiner, increasing the time and expense of maintenance operations on the locomotive.

SUMMARY

The present disclosure teaches technical advantages as a wedge driver and method therefor. The disclosure provides for the installation or removal of link joiners or hammer links on chains or other components. In one embodiment, a wedge driver can be operably coupled to different ends of a link joiner to drive a wedge therebetween to form a single link. The wedge driver can also drive the wedge out of the link joiner. The present disclosure provides the benefit of allowing the safe and effective removal of the link joiner by preventing violent or forceful decoupling of a link joiner, such that the link joiner does not have to be under strain. In another embodiment, the present disclosure can facilitate the driving of a wedge in a link joiner that is not under strain, such as a link joiner that is incorporated into a non-tensioned brake chain on a locomotive. In another embodiment, the present disclosure can enable a single person to safely remove a link joiner that is not under strain, such as from a non-tensioned chain, and such as by preventing forceful decoupling of the link joiner. In another example, the present disclosure can provide a driver that can be mechanically mobilized up and down a longitudinal axis, which can increase safety in link joiner wedge driving. For example, a spring-enabled driver can extend out of a wedge driver trunk opening by rotatable insertion of a bolt not the trunk opening, thereby mitigating the need for a person to place their hand or finger into the mouth of the wedge driver to adjust the driver.

In another embodiment, the present disclosure can provide for axial and stabilized driving of a wedge without the use of, e.g., a hammer. For example, the present disclosure can provide for the conversion of torque, such as can be applied to a bolt with a standard wrench head via a impact driver, wrench, or other mechanism, to axial pressure that can be focused on and directed to a wedge. In one embodiment, application of torque to a bolt can longitudinally drive the bolt via threads of the bolt; however, in another embodiment, such rotation of bolt during the driving, unmitigated, could cause unstable driving of a wedge, because rotation of the bolt could interfere with, e.g., the axial driving of the wedge at the point of contact between the bolt and wedge. In another embodiment, engaging the bolt with a driver in accordance with the principles of the present disclosure can enable the driver to similarly be driven longitudinally while mitigating rotational movement of the driver around a longitudinal axis of the driver, thereby providing for stabilized axial driving of a wedge by the driver.

An object of the present disclosure is to provide a wedge driver for inserting or removing a wedge from a link joiner. Another object of the present disclosure is to provide a method of operating a link wedge. Another object of the present disclosure is to provide a safe method of installing or removing link joiners on tensioned chains.

In another embodiment, the present disclosure can include a wedge driver. The wedge driver can include a trunk having a first trunk end, a second trunk end, and a trunk opening disposed through the trunk from the first trunk end to the second trunk end; a first prong extending from a first side of the second trunk end; a second prong extending from a second side the second trunk end; a driver having a first driver end, a second driver end, a channel disposed along at least a portion of the driver, a driver cap coupled to the first driver end, and an adapter coupled to the second driver end; a spring disposed around at least a portion of the driver; a bolt having a first bolt end and a second bolt end; and a trunk cap removably coupled to the first end of the trunk, the trunk cap having a threaded bolt opening aligned with the trunk opening and configured to receive the bolt. In one embodiment, the driver can be disposed within the trunk opening. In another embodiment, the first prong and the second prong can include a retention member disposed thereon to retain a link joiner. In another embodiment, the driver cap can prevent the driver from exiting the trunk opening through the threaded bolt opening. In another embodiment, the bolt can push at least a portion of the driver out of the second trunk end through the trunk opening. In another embodiment, the trunk opening can include a ledge proximate the second trunk end. In another embodiment, the spring can compress between the driver cap and the ledge when the bolt pushes at least a portion of the driver out of the second trunk end through the trunk opening. In another embodiment, the spring can push the driver cap through the trunk opening toward the first trunk end to retract at least a portion of the driver back into the trunk opening after spring compression. In another embodiment, a set member can engage the channel to prevent the driver from rotating around a longitudinal axis of the driver member. In another embodiment, the adapter can include a groove for receiving at least a portion of a wedge. In another embodiment, a length between the first prong and the second prong can be sized to receive a link joiner or hammer link.

In another embodiment, the present disclosure can include a method of operating a link wedge. The method can include the steps of receiving a link joiner between a first prong and a second prong of a wedge driver; positioning a wedge first end in a groove of a driver; positioning a wedge second end in a wedge opening of a link joiner; applying torque to a bolt in a first direction to extend at least a portion of the driver out of the wedge driver to push the wedge into the wedge opening without rotating the wedge; and applying torque to a bolt in a second direction to allow a spring disposed within the wedge driver to retract at least a portion of the driver back into the wedge driver. In another embodiment, the wedge driver can include a trunk having a first trunk end, a second trunk end, and a trunk opening disposed through the trunk from the first trunk end to the second trunk end. In another embodiment, the wedge driver can include a trunk cap removably coupled to the first end of the trunk, the trunk cap having a threaded bolt opening aligned with the trunk opening and configured to receive the bolt. In another embodiment, the driver can include: a first driver end, a second driver end, a channel disposed along at least a portion of the driver, a driver cap coupled to the first driver end, and an adapter coupled to the second driver end. In another embodiment, a spring can be disposed around at least a portion of the driver. In another embodiment, the driver cap can prevent the driver from exiting the trunk opening through the threaded bolt opening. In another embodiment, the trunk opening can include a ledge proximate the second trunk end. In another embodiment, the spring can push the cap through the trunk opening toward the first trunk end to retract at least a portion of the driver back into the trunk opening after spring compression. In another embodiment, a set member can engage the channel to prevent the driver from rotating around a longitudinal axis of the driver member.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principal features described herein. The examples used in the following description are intended to facilitate an understanding of the ways in which the disclosure can be implemented and practiced. Accordingly, these examples should not be construed as limiting the scope of the claims.

Figure 1A:
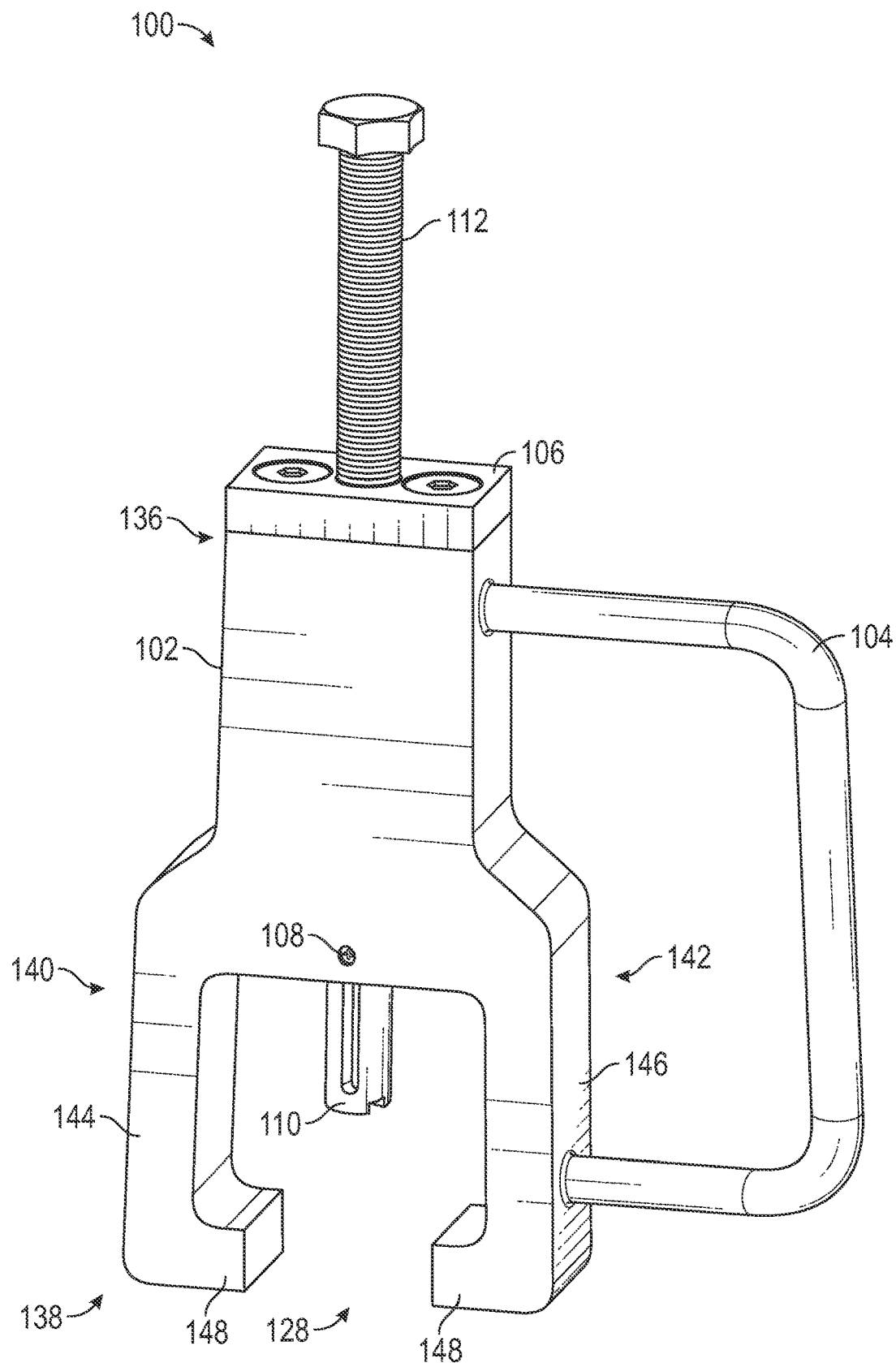
FIG. 1A illustrates a perspective view of a spring-loaded wedge driver, in accordance with one or more exemplary embodiments of the present disclosure.
Figure 1B:
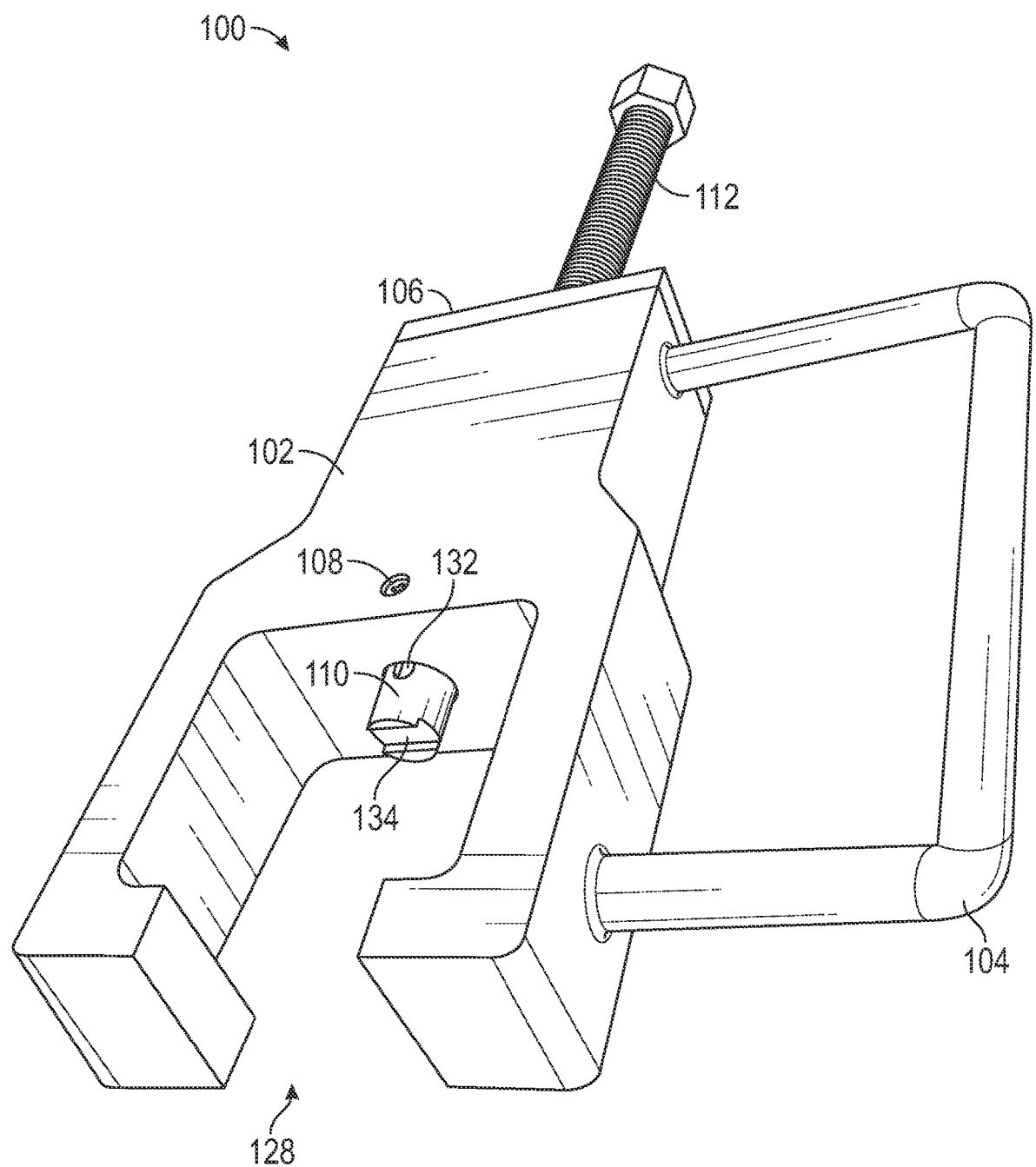
FIG. 1B illustrates a bottom perspective view of a spring-loaded wedge driver, in accordance with one or more exemplary embodiments of the present disclosure.

FIGS. 1A-1B illustrate a wedge driver 100 in accordance with the principles of the present disclosure. In one embodiment, the apparatus 100 can include a trunk 102 and a handle (handle member) 104. In another embodiment, the trunk can include a first trunk end 136, a second trunk end 138, a first side 140, and a second side 142. In one embodiment, the wedge driver 100 can include a first prong 144 that can extend from the first side 140 of the second trunk end 138. In another embodiment, the wedge driver 100 can include a second prong 146 that can extend from a second side 142 of the second trunk end 138. In another embodiment, the first and second prong 144, 146 can form a mouth 128 therebetween. In one embodiment, the trunk 102 and the first and second prongs 144, 146 can be made of a unitary body. In such a case, the unitary body can collectively be referred to as the main body or can be referred to by its individual components, the trunk 102 and the first and second prongs 144, 146. In one example, the first and second prongs 144, 146 can each include a retention member 148. For example, the retention member 148 can be a protrusion or lip that can retain a link joiner. In another embodiment, the wedge driver 100 can include a trunk cap (trunk cap member) 106 coupled to the first trunk end of the trunk 102. In one embodiment, the trunk cap 106 can be removably coupled to the trunk 102. In another embodiment, the trunk cap 106 can include a threaded bolt opening; in one example, the threaded bolt opening of the trunk cap 106 can be aligned with a trunk opening. In another embodiment, the threaded bolt opening can be configured to receive a bolt (such as bolt 112).

In another embodiment, the wedge driver 100 can include a bolt (bolt member) 112. In another embodiment, the bolt 112 can be coupled to the trunk 102 via threads disposed within at least a portion of the trunk opening. In another embodiment, the bolt 112 can be coupled to the trunk 102 via threads disposed within at least a portion of the trunk cap 106. In another example, application of torque to the bolt 112 can cause the bolt 112 to travel longitudinally within at least a portion of the wedge driver 100 or trunk 102. In one embodiment, the wedge driver 100 or trunk 102 can include a trunk opening (not shown in FIGS. 1A-1B). For example, the bolt 112 can travel within the trunk opening of the apparatus 100. In another embodiment, the apparatus 100 can include a driver (driver member) 110. For example, the driver 110 can travel longitudinally within the trunk opening of the trunk 102. In one embodiment, the application of torque to the bolt 112 can cause the driver 110 to travel within the trunk opening to contact and move the driver (e.g., the bolt 112 can push the driver 110 through at least a portion of the trunk opening). In another embodiment, the apparatus 100 can include a set member 108. In another embodiment, the set member 108 can selectively extend into a hole in the trunk 102 and travel therein, such as to abut the driver 110. In one embodiment, the set member 108 can engage within a channel 132 of the driver 110. For example, in this manner, the apparatus 100 can be configured to prevent the driver 110 from rotating and can allow longitudinal travel through the trunk opening. In one example, the set member 108 can prevent the driver 110 from rotating around a longitudinal axis of the trunk 102, and also keep driver 110 retained in trunk 102. In another embodiment, the set member 108 can be a pin, corrugation, embossing, a nub, or any other suitable component. In one embodiment, the bolt 112 can push at least a portion of the driver 110 out of the second trunk end 138 through the trunk opening.

In one embodiment, the apparatus 100, the trunk 102, and/or the driver 110 can be configured to receive a link (e.g., coupling link, chain link, etc.), a wedge, and/or a link and wedge, such as a hammer link or link joiner utilizing a wedge like those known in the art with respect to locomotive handbrakes. For example, the trunk 102 can include a mouth 128 between the first and second prongs 144, 146 that can be sized to receive a link. In another example, the mouth 128 can include a retention member 148. In one embodiment, the retention member 148 can be configured to retain a link joiner. For example, each retention member 148 can include a lip configured to receive and/or retain a link. In another example, the mouth 128 can be sized to allow the apparatus 102 to receive a link and further receive a loose wedge, such that the wedge can be aligned with the link within the mouth 128 and driven into the link by the driver 110 of the apparatus 102. In another example, the mouth 128 can include imprinting, embossing, corrugations, or any other elements suitable to facilitate the receiving or securing of a link within the mouth 128. Preferably, in another embodiment, the driver 110 can be configured to recede into the trunk 102, such as when the bolt 112 is loosened. For example, the driver 110 can be spring enabled, such that the driver 110 can recede out of the mouth 128 and into the apparatus 100 or trunk 102 (e.g., when the bolt 112 is loosened), such as to provide room for a link or link and wedge to be received within the mouth 128. In another example, the driver 110 can be configured to contact a wedge within the mouth 128 of the apparatus 100, such as to drive the wedge. For example, the driver 110 can include a notch 134 or groove 134 that can fit with a wedge. In another example, the driver 110 can include an adapter 134 coupled to an end of the driver 110 that can receive a wedge. In one embodiment, the adapter can include a groove 134 that can receive a portion of a wedge. In another embodiment, the groove 134 can be disposed on the second driver end directly, without any adapter. For example, the groove 134 can be sized to receive a wedge, such that the wedge can be stabilized against rotation or otherwise secured by the groove 112 of the driver 110, such as when the wedge is being driven into a link.

In operation, in one exemplary embodiment, the wedge driver 100 can receive a link wedge via the insertion of the link joiner between the first and second prongs 144, 146 through the mouth 128. In another embodiment, the wedge first end can be positioned in a groove of a driver and the second wedge end can be positioned in a wedge opening of the link joiner. In another embodiment, the application of torque to a bolt in a first direction (e.g., clockwise or counterclockwise) can extend at least a portion of the driver out of the wedge driver to push the wedge into the wedge opening of the link joiner without rotating the wedge. For example, the link joiner can rest on the retention member 148 of the first and second prongs 144, 146 to retain the link joiner in place while the wedge driver pushes the wedge into the wedge opening. In another embodiment, applying torque to the bolt in a second direction (e.g., counterclockwise or clockwise) to allow a spring disposed within the wedge driver to retract at least a portion of the driver back into the wedge driver. For example, the link joiner can rest on the retention member 148 of the first and second prongs 144, 146 to retain the link joiner in place while the wedge driver pushes the wedge out of the wedge opening and through the mouth 128.

Figure 1C:
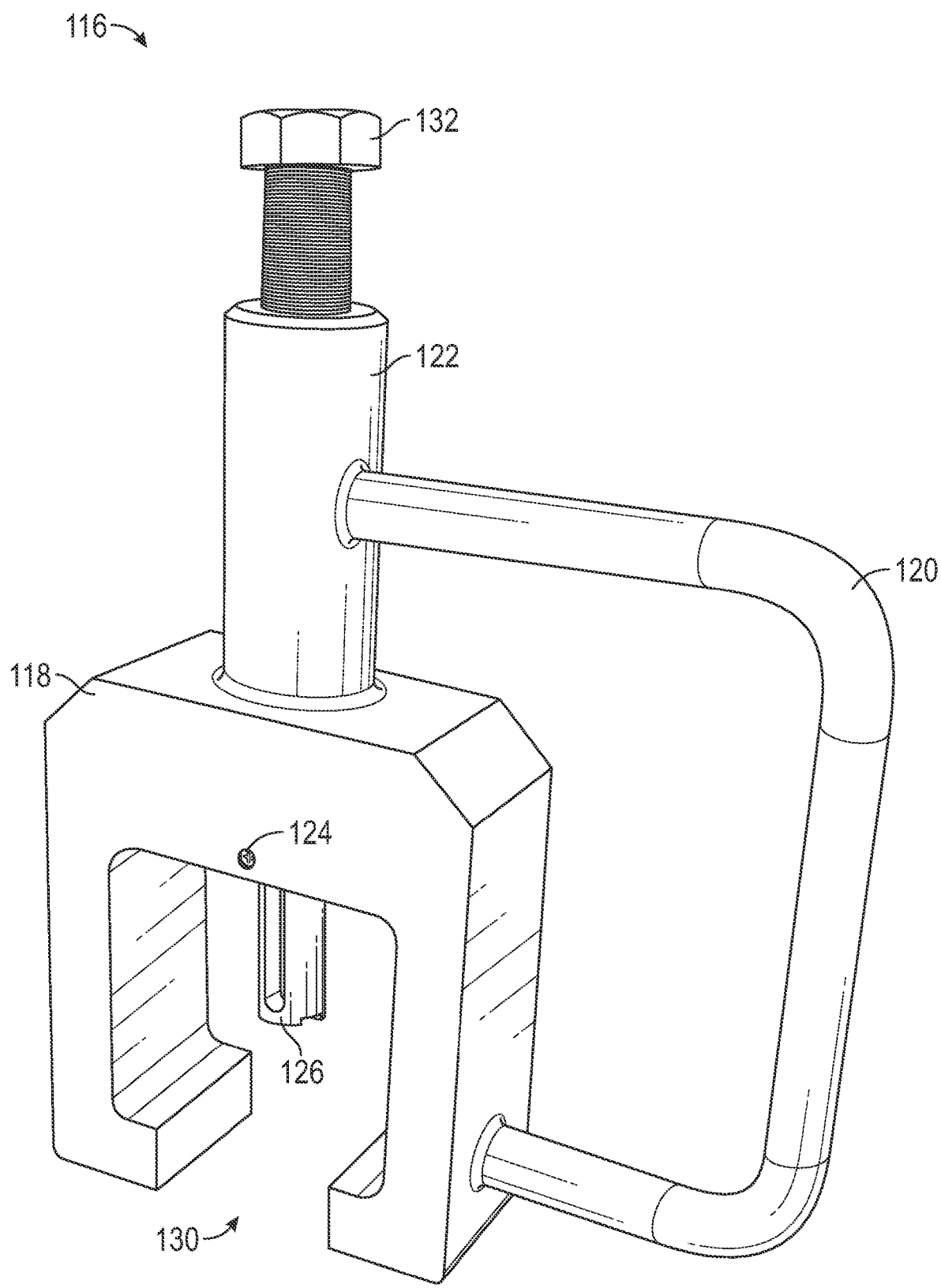
FIG. 1C illustrates a top perspective view of a non-spring-loaded wedge driver, in accordance with one or more exemplary embodiments of the present disclosure.

FIG. 1C depicts another embodiment of the present disclosure. A wedge driver 116 can be similar to apparatus 100. For example, the apparatus 116 can include a trunk 118, a handle 120, a driver-stabilizing set member 124, a mouth 130, a bolt 132, and a driver 126. In one embodiment, the apparatus 116 can vary from apparatus 100, in that apparatus 116 can include a hollow shaft 122 through which the bolt 132 can extend. In one example, the apparatus 116 can have the shaft 122 instead of a trunk cap 106. For example, the shaft 122 can include threads configured to engage the threads of the bolt 132, such that application of torque to the bolt 132 can cause the bolt 132 to travel longitudinally within the shaft 122 and apparatus 116. In another embodiment, the shaft 122 can provide an attachment point for the handle 120. In another embodiment, the shaft 122 can have threads only at the top of the shaft 122, such that a substantial portion of the shaft 122 can be smooth and act as a trunk opening for the bolt 132 and driver 126. In another embodiment, a trunk cap (such as trunk cap 106) can be sized to fit the shaft 122 and coupled or removably coupled to the shaft 122, and the bolt 132 can be screwably engaged to the trunk cap. For example, a trunk cap can act as a cap to the shaft 122, such that a bolt can extend through and contact the cap via threads on either the cap, the bolt, or both, and the shaft 122 can have a smooth trunk opening therein to house the bolt and/or the driver.

Figure 2:
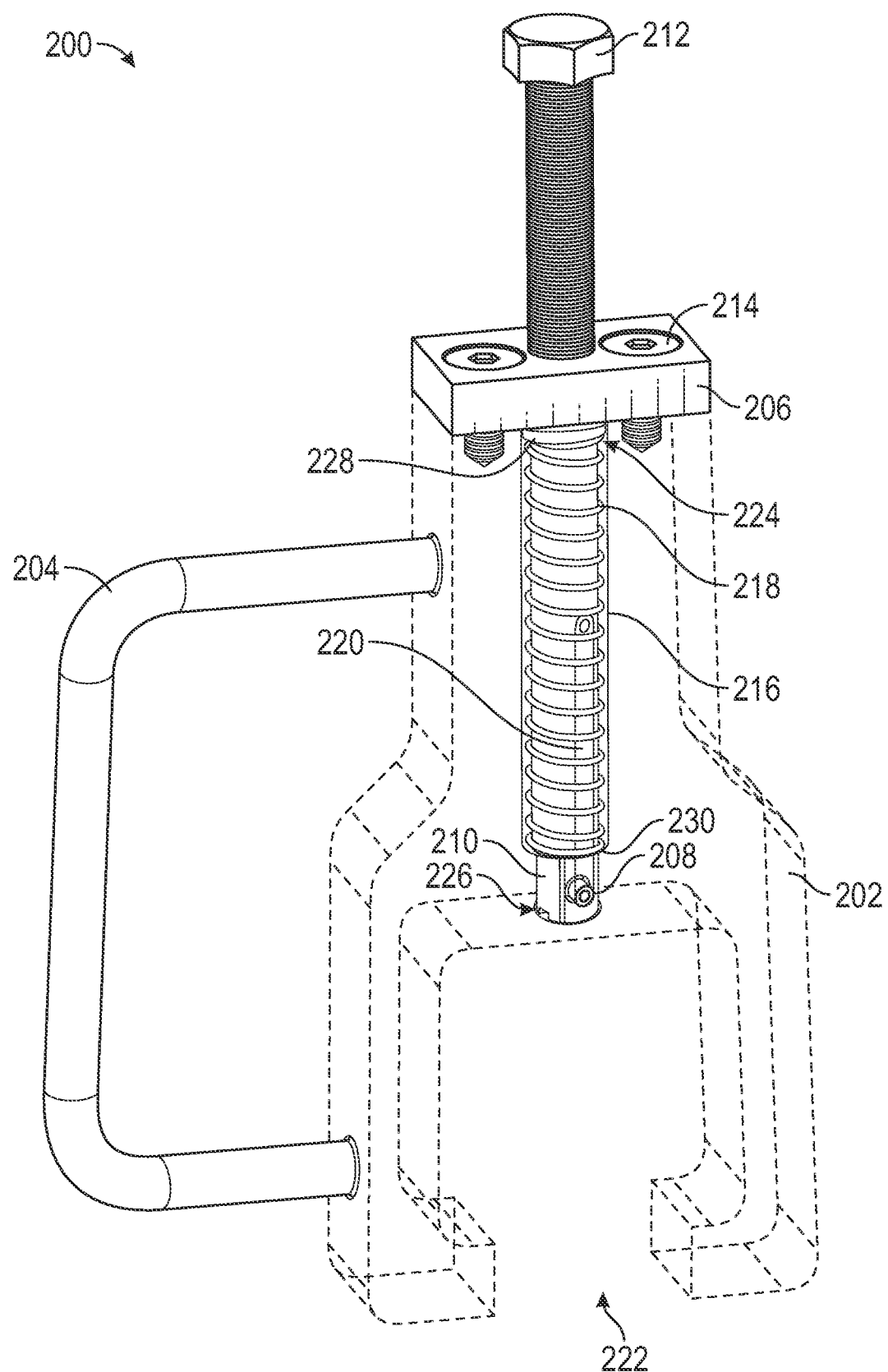
FIG. 2 illustrates a schematic view of the components of a wedge driver having a spring-enabled driver, in accordance with one or more exemplary embodiments of the present disclosure.

FIG. 2 illustrates another embodiment of the present disclosure. A wedge driver apparatus (wedge driver) (wedge driving system) 200 can be similar to apparatus 100 and apparatus 116. In one embodiment, the apparatus 200 can include a trunk 202 and a handle 204. In another embodiment, the apparatus 200 can include a trunk cap 206 coupled or removably coupled with the trunk 102; for example, a screw 214 or screws 214 can secure the trunk cap 206 to the trunk 202. In another embodiment the trunk 202 can include a trunk cap 206 to access, assemble, and replace components disposed within the trunk. In another embodiment, the trunk 202 and trunk cap. In one embodiment, the apparatus 200 can include a bolt 212. In one embodiment, the bolt 212 can be configured to travel longitudinally within the apparatus 200. For example, the bolt 212 can include threads that can correspond to threads of the trunk cap 206 or trunk 202, such that application of torque to the bolt 212 (such as to a head of the bolt 212) can cause the bolt to travel longitudinally within the apparatus 200. In one embodiment, the bolt 212 can be configured to engage a torque-generating mechanism, such as a wrench, drill, impact driver, human hand, or any other suitable torque-generating mechanism, such as a mechanism that can activate threads of the bolt 212 by turning the bolt 212. In another embodiment, the handle 204 can be secured to the trunk 202 via welding; in another embodiment, the handle 204 can be fabricated as part of the trunk 202. In another embodiment, the handle can be attached to the trunk 202 via adhesive, screws, latches, or any other mechanism suitable to attach the handle 204 to the trunk 202 such that the trunk 202 can be supported by handle 204, such as when an operator of the apparatus 200 is utilizing the apparatus 200.

In another embodiment, the apparatus 200 can include a driver 210. For example, the driver 210 can be similar to driver 110. In one embodiment, the driver 210 can include a first end 224 and a second end 226. In one example, the first end 224 can be configured to contact the bolt 212. For example, the first end 224 can include a recess configured to receive a protrusion, such as a protrusion at a tip of the bolt 212. In another embodiment, the first end 224 can be flat, such that the bolt 212 can contact the first end 224 and exert force on the driver 210. For example, the driver 210 can include a driver cap 228. In one embodiment, the driver cap 228 can be coupled to the first end 224 of the driver 210. In another embodiment, the driver cap 228 can prevent the driver 210 from exiting the trunk 202 through a threaded bolt opening of the trunk cap 206. In another embodiment, the first end 224 can be of any suitable design or configuration to allow the bolt 212 to contact the driver 210 such that the bolt can rotate against the first end 224 (such as when torque is applied to the bolt 212) and exert force against the driver 210 (such as to cause the driver 210 to travel within the trunk opening 216). In one embodiment, the driver 210 can be spring enabled, such as via a spring 218 that can compress and expand within the trunk opening. In another embodiment, the driver 210 can include a spring 218 disposed around at least a portion of the driver 210. For example, the first end 224 can include a head (e.g., a driver cap 228). For example, the head can have a larger diameter than the spring 218, such that the spring can abut the head when the spring 218 is compressed between the driver cap 228 and the ledge 230. In another embodiment, the first end 224 can include a pin, nubs, embossing, or any other design or mechanism suitable to abut the spring 218 and allow the spring 218 to compress thereagainst. In another embodiment, the driver 210 can include a channel 220 extending longitudinally on the surface of the driver 210. In one embodiment, the channel 220 can be configured to engage a set member 208 of the apparatus that can extend through the trunk 202. In this manner, for example, the driver 210 can be configured to be stabilized against rotation along a longitudinal axis of the driver 210. In another embodiment, the second end 226 of the driver 210 can be configured to contact a wedge. For example, the second end 226 can include a groove adapted to receive a top of a wedge and facilitate stable driving of the wedge, such as into a link. The second end 226 can have a groove similar to groove 134 in FIGS. 1A-1B.

In another embodiment, the driver 210 can move longitudinally within a trunk opening 216 of the apparatus 200. For example, the trunk 202 can include a trunk opening 216 configured to house the driver 210 and spring 218, such as by having a larger diameter than the driver 210 such that the driver can travel longitudinally therein. Preferably, the driver 210 can be a spring-enabled driver 210. For example, a spring (such as spring 218) can exert pressure against the driver 210, such that as the bolt 212 progresses out of the trunk opening 216 and therefore relieves pressure on the driver 210, the driver 210 can recede into the trunk 202 via force exerted by the spring 218. In another embodiment, driver 210 can be pushed by the bolt 212 when torque is applied to the bolt 212 that causes the bolt 212 to progress further into the trunk 202 via threads of the bolt 212. In another example, the driver 210 can move longitudinally such that it extrudes into a mouth 222 of the trunk 202. In one embodiment, the trunk opening 216 can have a uniform diameter; in another embodiment, the diameter of the trunk opening 216 can have a wider portion and a narrower portion. For example, the trunk opening 216 can have a portion with a diameter configured to accommodate the driver 210 and spring 218 disposed thereon. In one embodiment, the trunk opening 216 can include a ledge (lip) 230 therein that the spring 218 can compress against, such as when the spring 218 is compressed by first end 224 of the driver 210.

In another embodiment, the trunk opening 216 can include a ledge 230 proximate a second trunk end (such as second trunk end 138). In one example, the spring 218 can compresses between the driver cap 228 and the ledge 230 of the trunk opening 216 when the bolt 212 pushes at least a portion of the driver 210 out of the second trunk end through the trunk opening 216. In another embodiment, the spring 218 can push the driver cap 228 through the trunk opening 216 toward a first end of the trunk 202 to retract at least a portion of the driver 210 back into the trunk opening 216 after spring 218 compression. In one embodiment, the lip 230 can have a diameter larger than that of the driver 210, such that the driver 210 can travel through the lip 230 and into a narrower portion of the trunk opening (and out into the mouth 222) while the spring 218 can be compressed against the lip 230. In another embodiment, the trunk opening can include embossing, ridges, a pin, or any other mechanism suitable to provide a compression surface for the spring 218 to compress against. In this manner, the trunk opening 216 can be configured to house the driver 210 or spring-enabled driver member 210. In another example, and in this manner, the apparatus 200 can include a spring-enabled driver.

Figure 3A:
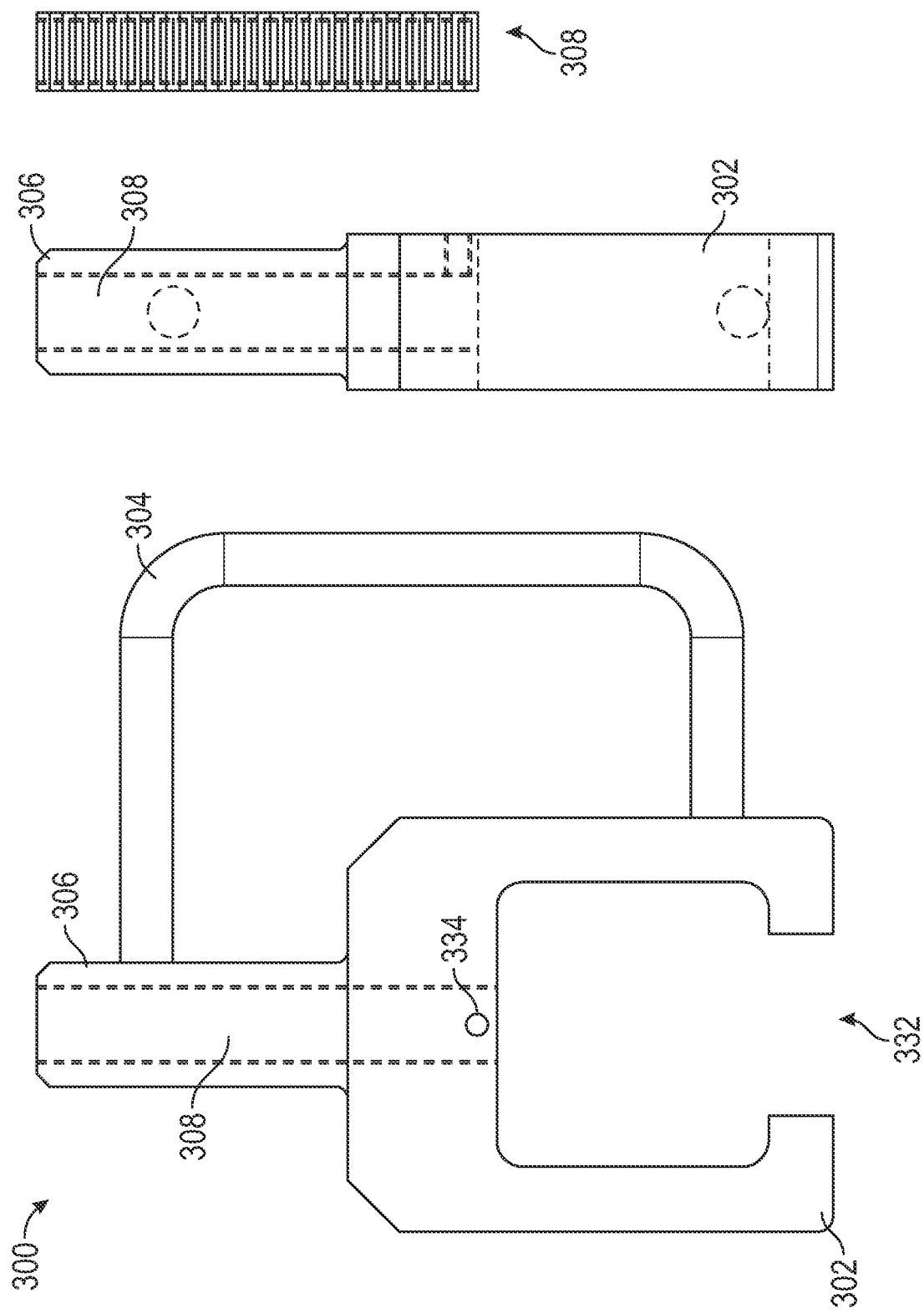
FIG. 3A illustrates a schematic view of some of the components of a non-spring-loaded wedge driver, in accordance with one or more exemplary embodiments of the present disclosure.
Figure 3B:
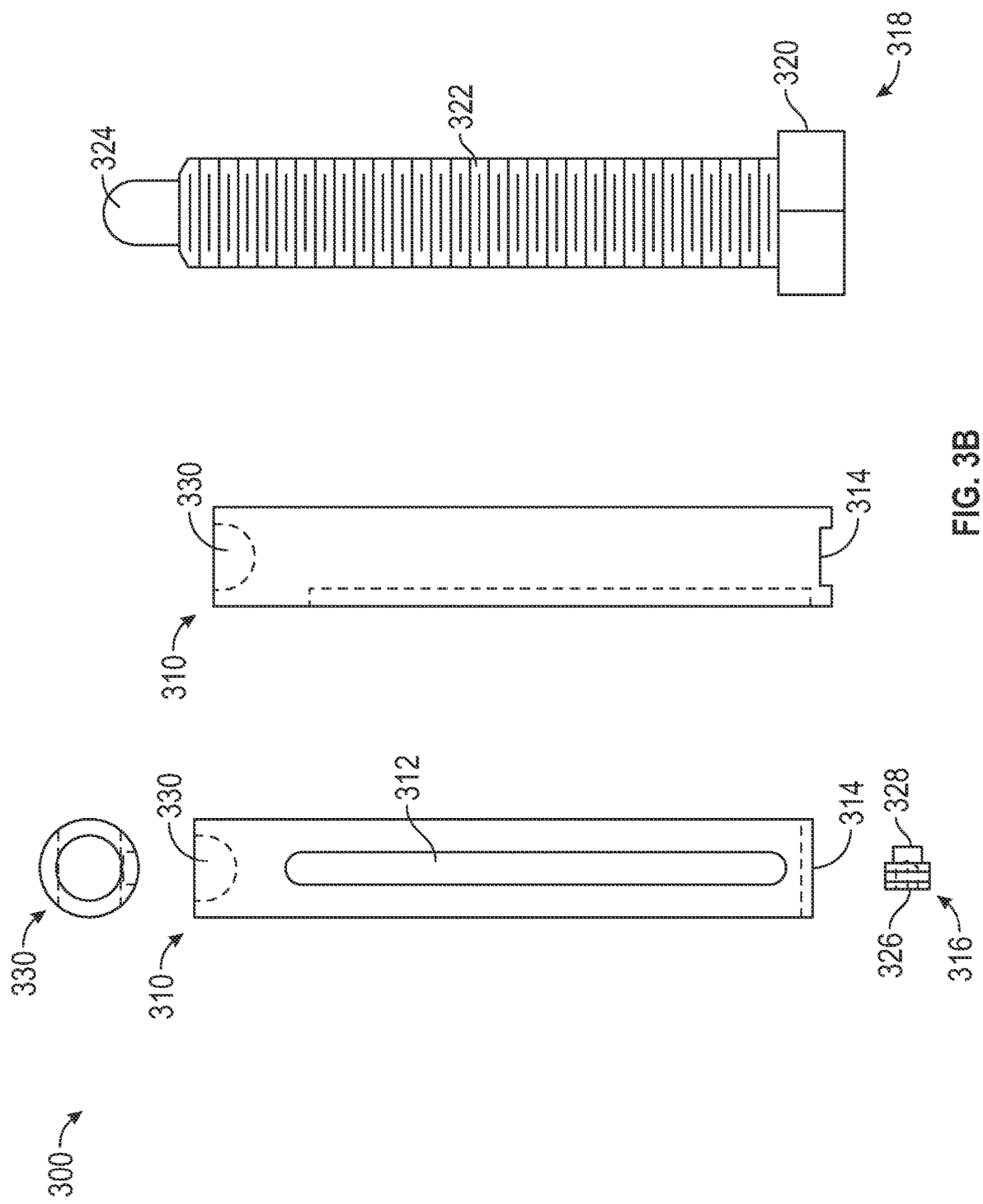
FIG. 3B illustrates another schematic view of some of the components of a wedge driver, in accordance with one or more exemplary embodiments of the present disclosure.

FIGS. 3A-3B depict another embodiment of the present disclosure and preferred dimensions thereof. In one embodiment, a wedge driver 300 can include a trunk member 302, a handle member 304, and a shaft member 306. In another embodiment, a trunk opening 308 can extend through the shaft 306 and the trunk 302 and into a mouth 332 of the trunk 302. In one example, the mouth 332 of the trunk can have a height of 5.3 inches, a width of 5.5 inches, and an opening of 3.5 inches. In another example, the trunk 302 can have a width of 8.0 inches, a height of 9.375 inches, and a thickness of 3.0 inches. In one example, the mouth 332 of the trunk can have a height of 2.625 inches, a width of 2.75 inches, and an opening of 1.75 inches. In another example, the trunk 302 can have a width of 4.0 inches, a height of 4.6875 inches, and a thickness of 1.5 inches. In one embodiment, edges and/or corners of the trunk 302 can be beveled. In another embodiment, the shaft 306 can have a length of 3.0 inches and a thickness of 1.2 inches. In one example, the handle 304 can be secured to the trunk 302 and the shaft 306. For example, the handle 304 can extend 4.15 inches from the shaft 306, and 2.75 inches from the trunk 302. In one embodiment, the handle 304 can have a maximum inner diameter of 5.0 inches. In another embodiment, a trunk opening 308 can extend through the shaft 306 and trunk 302 and be accessible at the mouth 332 of the trunk 302 and top of the shaft 306. In one example, the trunk opening 308 can be threaded. In another example, the trunk opening can be 4.25 inches long. In another embodiment, the trunk opening can have inner threads ⅝-inch-18 and outer threads of ¾-inch-16. In one embodiment, the trunk 302 can include a hole 334; in one example, the hole 334 can be configured to receive a set member or set screw, such as set member 316. In another embodiment, a length between a first prong and second prong of the trunk 302 can be sized to receive a link joiner or hammer link.

In one embodiment, a driver 310 can include a channel, such as a channel 312, that can engage with a driver-stabilizing set member (e.g., set member 316) of a trunk 302. For example, the driver 310 can be 7.12 inches long; in another example, a driver 310 can be 1.124 inches thick. In one embodiment, a channel 312 on the driver 310 can be around 5.0 inches long; in another embodiment, the channel 312 can be 0.375 inches wide. For example, the driver 310 can be 3.56 inches long; in another example, a driver 310 can be 0.562 inches thick. In one embodiment, a channel 312 on the driver 310 can be around 2.687 inches long; in another embodiment, the channel 312 can be 0.1875 inches wide. In one example, the channel can have rounded ends, such that the ends of the channel 312 can accommodate a round set member or pin engaged within the channel 312 (such as set member 316). In another embodiment, the channel 312 can have a depth of approximately 0.19 inches. In another embodiment, the channel 312 can have a depth of approximately 0.0935 inches. In another embodiment, the driver 310 can include a first end 330 and a second end 314. In one embodiment, the first end 330 can be configured to contact a bolt, such as bolt 318. For example, the first end 330 can include a recess configured to receive a protrusion of the bolt 318, such as protrusion 324 of bolt 318. In one embodiment, the recess of the first end 330 can have a diameter of 0.75 inches. In one embodiment, the recess of the first end 330 can have a diameter of 0.375 inches; in another embodiment, the recess can have a rounded bottom, such as to accommodate a rounded protrusion (such as protrusion 324). In another embodiment, the recess of the first end 330 can have a depth of 0.5 inches, and a radius of curvature of approximately 0.375 inches. In another embodiment, the recess of the first end 330 can have a depth of 0.25 inches, and a radius of curvature of approximately 0.1875 inches. In another embodiment, the driver 310 can have a second end 314 configure to contact a wedge. For example, the second end 314 can have a groove. In another example, the groove can be a recess, such as a rectangular recess, in the second end 314, and can have a depth of approximately 0.125 inches. In another embodiment, the recess can have a width of approximately 0.685 inches. In another example, the groove can be a recess or rectangular recess in the second end 314 and can have a depth of approximately 0.0625 inches. In another embodiment, the recess can have a width of approximately 0.3425 inches.

In one embodiment, a wedge driving system can include a bolt 318, such as a bolt that can couple with the trunk 302. In one example, the bolt 318 can include a head 320, a shaft 322, and a protrusion 324. In another embodiment, the bolt 318 can include a first bolt end 320 and a second bolt end 324. In one embodiment, the head can be a standard wrench head, such as a hexagonal wrench head; in another embodiment, the head 320 can be a flat head, Philips head, or any other head suitable to facilitate the application of torque to the bolt 318. In one embodiment, the head 320 can be 1.875 inches wide. In one embodiment, the head 320 can be 0.9375 inches wide. In another embodiment, the shaft 322 can be 6.899 inches long. In another embodiment, the shaft 322 can include 6.75 inches of length that is uniform, and at the end of the shaft 322 nearest the protrusion 324, the shaft 322 can taper for a longitudinal distance of approximately 0.244 inches. In another embodiment, the shaft 322 can be 3.4495 inches long. In another embodiment, the shaft 322 can include 3.3875 inches of length that is uniform, and at the end of the shaft 322 nearest the protrusion 324, the shaft 322 can taper for a longitudinal distance of approximately 0.0620 inches. For example, the end of the bolt 318 can taper at an angle of approximately 60°. In another example, the end of the bolt 318 can taper at an angle of approximately 30°. In one example, the protrusion 324 can be 0.736 inches wide; in another embodiment, the protrusion 324 can have a height of approximately 0.51 inches as measured from the bottom of the protrusion 324 to a center point of the curvature of the protrusion 324. In another example, the protrusion can have a radius of curvature of approximately 0.368 inches. In one example, the protrusion 324 can be 0.3680 inches wide; in another embodiment, the protrusion 324 can have a height of approximately 0.2505 inches as measured from the bottom of the protrusion 324 to a center point of the curvature of the protrusion 324. In another example, the protrusion can have a radius of curvature of approximately 0.1840 inches. For example, the protrusion 324, as described with respect to FIGS. 3A-3B, can have dimensions allowing the protrusion 324 to fit within the recess at the first end 330 of the driver 310, and in this manner, the bolt 318 can be configured to contact the driver 310. In one embodiment, the bolt 318 can include threads on the shaft 322; in one example, the threads can be ⅝-inch-18 threads. In another example, the bolt 318 can be a ⅝-18 GR8 bolt with threads running the length of the shaft 322. In one embodiment, the threads of the shaft 322 can be configured to engage the threads of the trunk opening 308.

In another embodiment, the system can include a set member 316 or set screw 316, such as can be engaged within the hole 334 on the trunk 302. In one example, the hole 334 can include a thread or threads that can correspond to a thread or threads on the set member 316. In one embodiment, the set member 316 can include a first end 326 and a second end 328. In one example, the first end 326 can include a standard wrench head, such as a hex wrench, Philips head, flat head, or any other head suitable to facilitate the application of torque to the set member 316. In one example, the set member 316 can be a set screw, such that a wrench head of the set member 316 can be recessed or indented into the first end 326 of the set member 316. In another embodiment, the second end 328 of the set member 316 can include a nib; in one embodiment, the nib of the second end 328 of the set member 316 can be configured to engage the channel 312 of the driver 310. For example, the nib can have a diameter of 0.360 inches; in another example, the nib can have a height of 0.180 inches. In another embodiment, the set member 316 can have a diameter of 0.5 inches. In one embodiment, the first end 326 can be approximately 0.32 inches long. For example, the nib can have a diameter of 0.180 inches; in another example, the nib can have a height of 0.09 inches. In another embodiment, the set member 316 can have a diameter of 0.25 inches. In one embodiment, the first end 326 can be approximately 0.156 inches long. In another embodiment, the set member 316 can be a ¼-inch-20 screw. In one embodiment, the nib can be configured to engage within a channel 312, such as via the dimensions of the nib and channel 312 like those discussed herein.

Figure 4A:
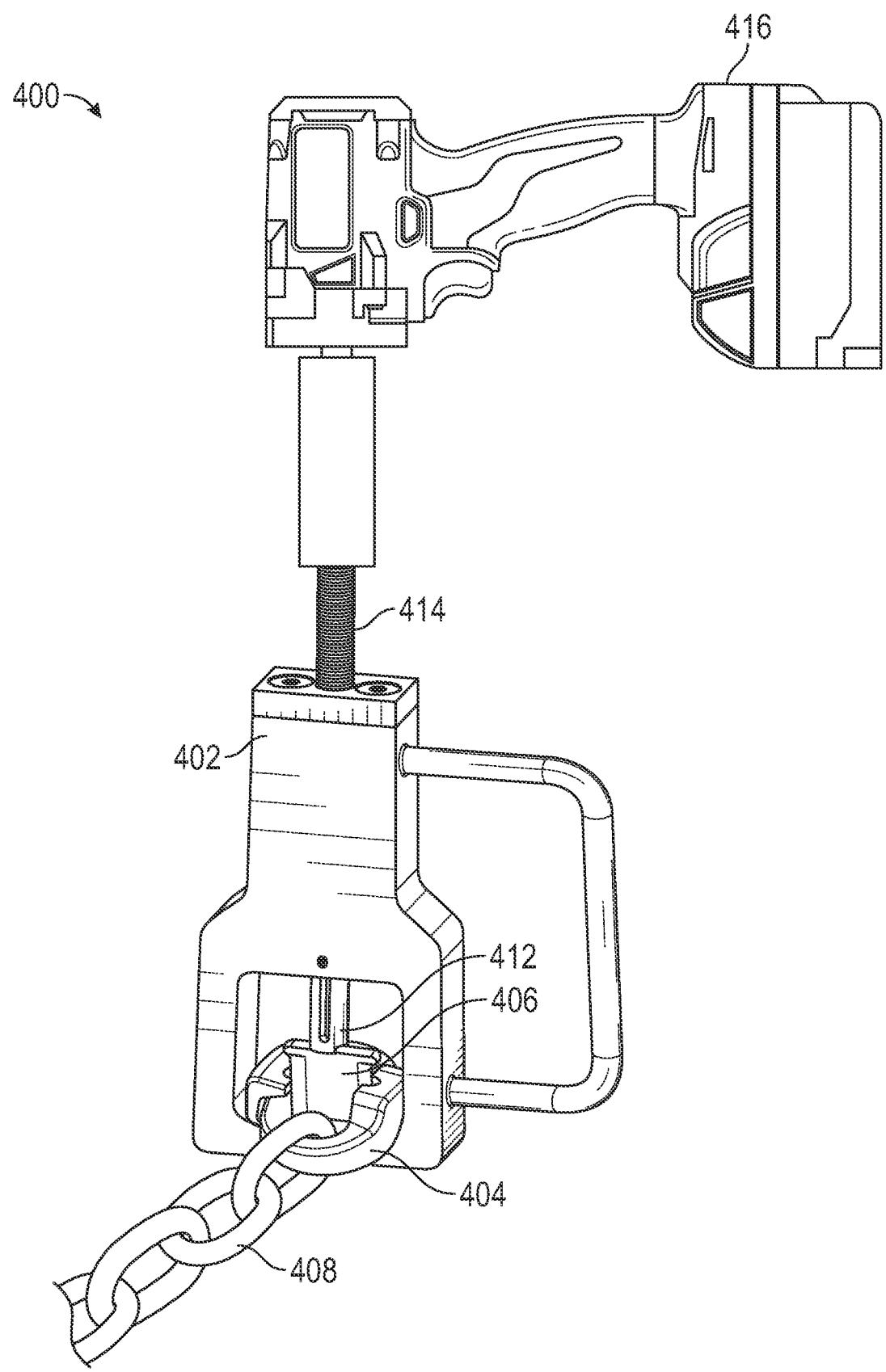
FIG. 4A illustrates a wedge being driven into a link using a wedge driver when the link is under strain, in accordance with one or more exemplary embodiments of the present disclosure.
Figure 4B:
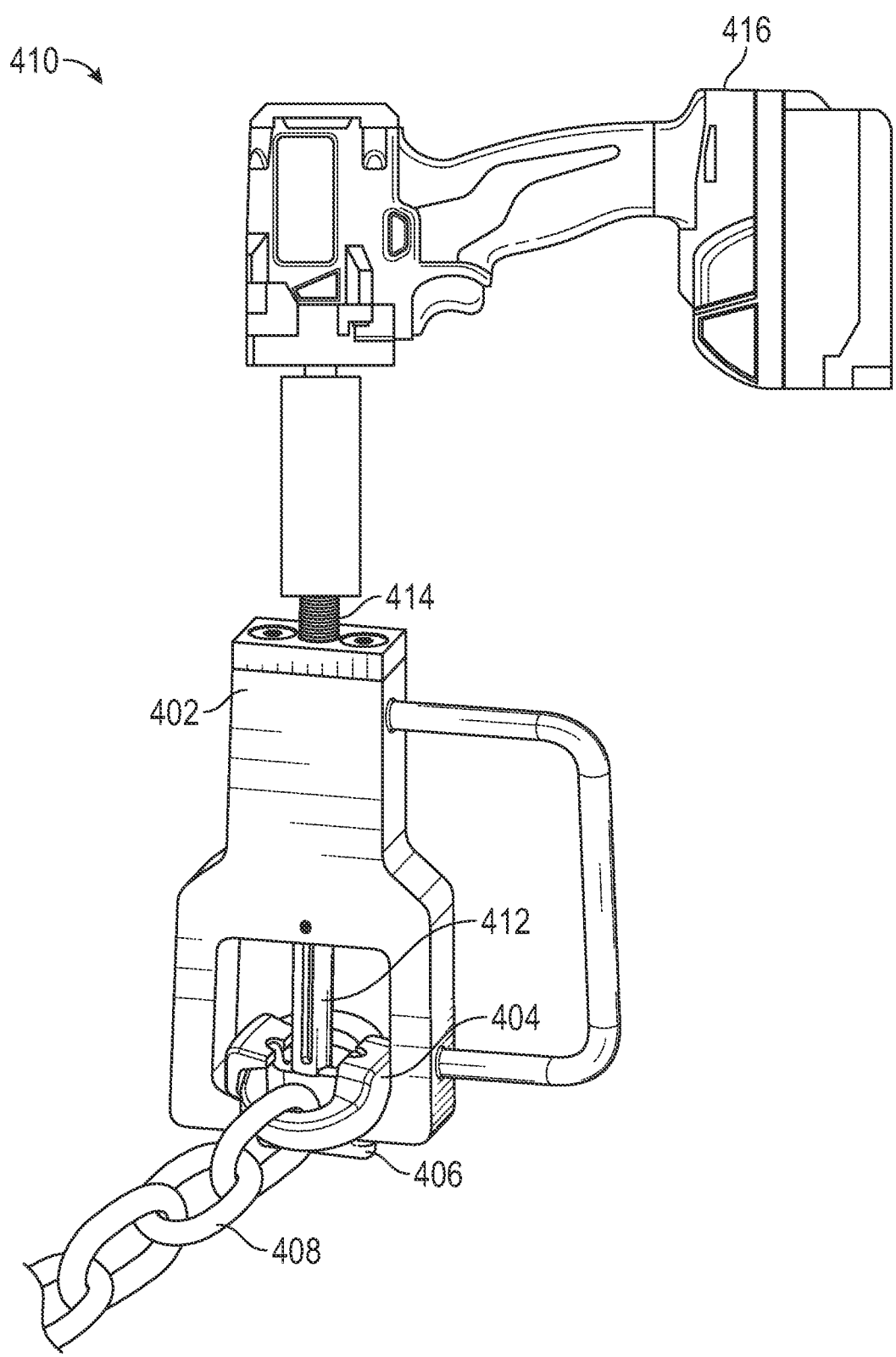
FIG. 4B illustrates a wedge being driven out of a link using a wedge driver when the link is not under strain, in accordance with one or more exemplary embodiments of the present disclosure.

FIGS. 4A-4B depict another embodiment 400 of the present disclosure. In one embodiment, a method of operating a link wedge can include a wedge driver apparatus 402. For example, the apparatus 402 can be similar to wedge driver 100, 200, and/or that depicted in FIGS. 3A-3B. The apparatus 402 can receive a link 404 (e.g., hammer link, link joiner, etc.). In one embodiment, a mouth of the apparatus 402 can be configured to receive the link 404 such that the retention member (lips) of the trunk of the apparatus 402 can support the link 404 in the mouth of the trunk, such as between a first prong and a second prong of the apparatus 402. In another embodiment, the apparatus 402 can be configured to receive a link 404 and a wedge 406 to be driven therein. In one example, the driver 412 of the apparatus 402 can be withdrawn into the trunk, such that there can be adequate space in the mouth of the trunk for the link 404 and wedge 406 to fit. Preferably, in one example, with the link 404 in position within the trunk, and the wedge 406 primed to be driven into the link 404, the driver 412 of the apparatus 402 can contact the wedge 406 in accordance with the principles of the present disclosure. In one embodiment, a bolt 414 of the apparatus 402 can exert force on the driver 412 and cause the driver 412 to push the wedge 406 into the link 404. In one embodiment, driving the wedge 406 into the link 404 can secure and/or close the link 404. In another embodiment, the method 400 can be performed while a chain 408 is coupled to a brake handle and/or lever of a locomotive handbrake system.

In another embodiment, a method of driving a wedge 410 out of a link 404 can similarly include receiving a link 404 with a secured wedge 406 within a mouth of a trunk of a wedge driving apparatus 402. Similar to method 400, the driver 412 of the apparatus 402 can contact the wedge 406 and move via application of torque to the bolt 414. In this manner, the method 410 can drive a wedge 406 out a link 404, such as to remove the link from a chain 408. In one embodiment, receiving the link 404 within the mouth of the trunk can prevent separation of the link 404 components when the wedge 406 is removed from the link 404. For example, when the method 410 is applied to a link 404 and wedge 406 that is connect to a tensioned chain 408, removal of the wedge 406 can lead to separation of the link 404 components, facilitating the removal of the link 404 from the chain 408. In one embodiment, application of the removing a wedge from a link can be dangerous, because once the wedge 406 is removed, the link 404 components can come apart with significant force, potentially injuring personnel. In one example, the trunk, having received the link 404, can prevent violent separation, such that the link 404 can be kept closed when the wedge 406 is removed, such that the link 404 can be safely detached after, e.g., the operator of the apparatus 402 has removed the wedge 406 from the link 404. Preferably, in one embodiment, methods 400, 410 can include the use of an electric drill 416 or electric impact driver 416 that can apply torque to the bolt 414, such as to drive the wedge 406 into or out of the link 404. In another embodiment, a manual wrench can be used; in another example, the bolt 414 can be configured to be turned by hand, such as by incorporating a lever, a wheel, or any other mechanism suitable to enable the bolt 414 to be turned by hand.

Figure 5A:
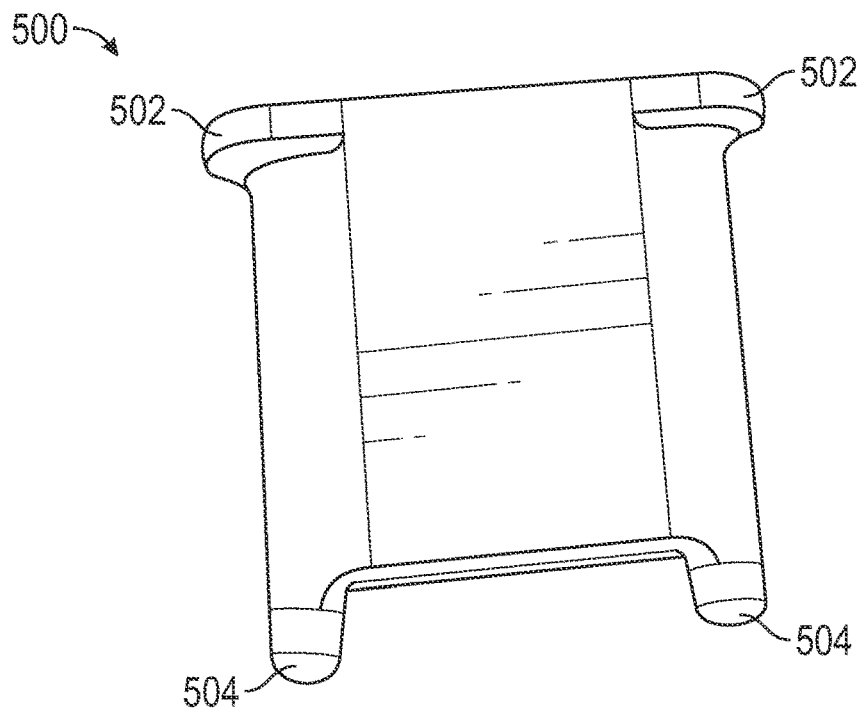
FIG. 5A illustrates a prior art wedge including ears and pins, in accordance with one or more exemplary embodiments of the present disclosure.
Figure 5B:
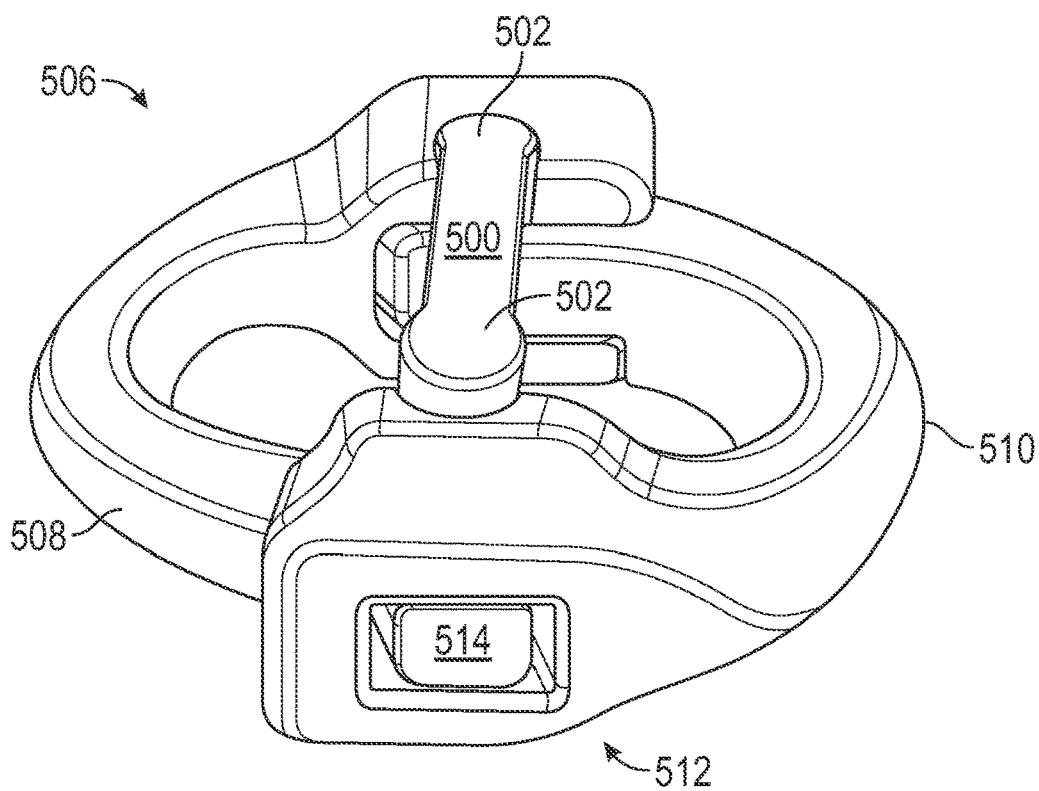
FIG. 5B illustrates a prior art link joiner including a driven wedge, in accordance with one or more exemplary embodiments of the present disclosure.

FIG. 5A-5B depict another embodiment of the present disclosure. A wedge (link wedge) 500 can be similar to wedges known in the art, such as those used with links or link joiners in locomotive handbrake systems. The wedge 500 can include ears 502 and pins 504. In another embodiment, the wedge 500 can include a wedge first end 502 and a second wedge end 504. In one embodiment, at least a portion of the wedge 500 between the ears 502 can fit within or contact a groove of a driver of a wedge driver apparatus in accordance with the principles of the present disclosure. In another embodiment, the ears 502 can prevent the wedge from being overdriven within a link or hammer link or link joiner. In another embodiment, the pin 504 or pins 504 can guide the wedge 500 into grooves of a link or a wedge opening of a link joiner, such as when the wedge 500 is being driving into a link. In one example, a link (link joiner) 506 can include a wedge 500, a first stirrup 508, and a second stirrup 510. In one embodiment, the first and second stirrups 508, 510 can couple to one another, such as can be seen in FIG. 5B. For example, each of the stirrups 508, 510 can be configured to correspond to the other, such as by including a cavity 512 capable of receiving a spur 514 of the other stirrup. In another example, each of the stirrups 508, 510 can be configured to receive the wedge 500 via a wedge opening.

In one embodiment, each of the stirrups 508, 510 can include a pair of furrows configured to align with furrows on the other stirrup. For example, a stirrup 508, 510 can include a furrow traversing the cavity 512 on the inner circumference of the link joiner 506; in one embodiment, a longitudinal axis of the furrow can be substantially perpendicular to a longitudinal axis of the link joiner 506. In another example, the stirrup 508, 510 can include or further include a furrow traversing the spur 514 on the inner circumference of the link joiner 506; in one embodiment, a longitudinal axis of the furrow can be substantially perpendicular to a longitudinal axis of the link joiner 506. Preferably, each of the stirrups 508, 510 can include a pair of furrows, and in one embodiment, the each of stirrups 508, 510 can be configured such that each of their furrows align with furrows on the other stirrup 508, 510. In this manner, when the stirrups 508, 510 are coupled to one another, their furrows can form two grooves on the inner circumference of the link joiner 506. Preferably, the grooves can each be located at the points of coupling between the cavities 512 and spurs 514 of the stirrups 508, 510. In another embodiment, these grooves can be configured to receive the wedge 500. For example, the wedge 500 can be driven into the grooves of the stirrups 508, 510 in accordance with the principles of the present disclosure. In one embodiment, the force exerted by the wedge 500 on the stirrups 508, 510 can secure the stirrups 508, 510 together. In another embodiment, the ears 502 of the wedge 500 can prevent the wedge 500 from being over-driven through the stirrups 508, 510 of the link joiner.

In one embodiment, the wedge driver apparatuses and systems disclosed herein can be made of any suitable material. Preferably, the trunk, trunk cap, bolt, driver, spring, screw, and other components and members discussed herein can be made of a metal, such as aluminum, steel, iron, copper, bronze, or any other metal or alloy thereof. In another embodiment, the apparatuses and systems herein can be made of polymers, plastics, or any other non-metallic material suitable to enable the driving of a wedge, such as a wedge in a link joiner. In another embodiment, the components discussed herein can be made of the same material or different material. In another embodiment, a wedge driver apparatus or system can be configured to be as light as possible while maintaining the strength and structural integrity necessary to drive wedges. For example, the trunk can be made of aluminum while the trunk cap, bolt, and driver can be made of steel.

The present disclosure achieves at least the following advantages:
1. Increasing safety of wedge driving in hammer link installation;
2. Facilitating the installation and repair of chains or chain segments, such as in locomotive handbrake systems;
3. Providing an apparatus and method for chain repair;
4. Facilitating the repair of locomotive handbrake systems without removing the chain from the system;
5. Providing a wedge driver with a driver member that is stabilized against rotation around a longitudinal axis of the driver member;
6. Providing a method of removing a wedge from a link joiner that maintains the link joiner in an attached state immediately after removal of the wedge, such that violent separation of the link joiner components is mitigated or prevented; and
7. Facilitating axial driving of wedges in link joiners while preventing unwanted rotational movement at the point of contact between the driver and wedge.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A wedge driver, comprising:
a wedge driver mouth configured to at least partially receive a link joiner or a hammer link;
a driver having a first driver end and a second driver end, and an adapter coupled to the second driver end, the adapter configured to receive a wedge;
a bolt configured to extend the driver at least partially within the wedge driver mouth to push the wedge into the link joiner or the hammer link.

2. The wedge driver of claim 1, wherein the mouth includes a retention member configured to retain the link joiner or a hammer link.

3. The wedge driver of claim 2, wherein the retention member includes a lip configured to retain the link joiner or the hammer link.

4. The wedge driver of claim 3, wherein the member is a trunk having a first trunk end, a second trunk end, and a trunk opening disposed through the trunk from the first trunk end to the second trunk end.

5. The wedge driver of claim 1, wherein driving the wedge into the link joiner or the hammer link closes the link.

6. The wedge driver of claim 1, wherein the driver includes a channel disposed along at least a portion of the driver.

7. The wedge driver of claim 6, wherein a set member can engage the channel to prevent the driver from rotating around a longitudinal axis of the driver member.

8. The wedge driver of claim 1, further comprising a spring disposed around at least a portion of the driver.

9. The wedge driver of claim 8, wherein the spring pushes the driver through a trunk opening toward a first trunk end to retract at least a portion of the driver back into the trunk opening after spring compression.

10. The wedge driver of claim 1, wherein the wedge driver includes a handle.

11. The wedge driver of claim 1, wherein the application of torque to the bolt in a first direction extends at least a portion of the driver toward the link joiner or hammer link.

12. A method of operating a link wedge, comprising:
disposing a link joiner at least partially within a mouth of a wedge driver;
positioning a wedge first end in a groove of a driver;
positioning a wedge second end in a wedge opening of the link joiner; and
extending at least a portion of the driver out of the wedge driver to push the wedge into the wedge opening without rotating the wedge;
wherein the driver includes a first driver end, a second driver end, and an adapter coupled to the second driver end, the adapter configured to receive the wedge.

13. The method of claim 12, wherein the wedge driver further includes:
a trunk having a first trunk end, a second trunk end, and a trunk opening disposed through the trunk from the first trunk end to the second trunk end.

14. The method of claim 13, wherein the wedge driver includes a trunk cap removably coupled to the first end of the trunk, the trunk cap having a threaded bolt opening aligned with the trunk opening and configured to receive the bolt.

15. The method of claim 12, wherein the driver includes a channel disposed along at least a portion of the driver and a driver cap coupled to the first driver end.

16. The method of claim 12, wherein applying torque to a bolt in a first direction extends at least a portion of the driver out of the wedge driver.

17. The method of claim 16, wherein the torque is converted to axial pressure on the wedge.

18. The method of claim 13, further comprising applying torque to a bolt in a second direction to allow a spring to retract at least a portion of the driver back into the wedge driver.

19. The method of claim 18, wherein the spring pushes the cap through the trunk opening toward the first trunk end to retract at least a portion of the driver back into the trunk opening after spring compression.

20. The method of claim 15, wherein a set member can engage the channel to prevent the driver from rotating around a longitudinal axis of the driver member.

* * * * *